(12) United States Patent
Volkening et al.

(10) Patent No.: US 12,028,168 B2
(45) Date of Patent: Jul. 2, 2024

(54) DEVICE WITH MULTI-CHANNEL BONDING

(71) Applicant: MAXLINEAR, INC., Carlsbad, CA (US)

(72) Inventors: Ingo Volkening, Singapore (SG); Amos Klimker, Tel Aviv-Jaffa (IL); Rafi Abraham, Herzliya (IL)

(73) Assignee: MaxLinear, Inc., Carlsbad, CA (US)

( * ) Notice: Subject to any disclaimer, the term of this patent is extended or adjusted under 35 U.S.C. 154(b) by 155 days.

(21) Appl. No.: 17/659,281

(22) Filed: Apr. 14, 2022

(65) Prior Publication Data
US 2022/0337354 A1  Oct. 20, 2022

Related U.S. Application Data

(60) Provisional application No. 63/176,146, filed on Apr. 16, 2021.

(51) Int. Cl.
*H04L 1/1829* (2023.01)
*H04L 1/1607* (2023.01)

(52) U.S. Cl.
CPC .......... *H04L 1/1841* (2013.01); *H04L 1/1642* (2013.01)

(58) Field of Classification Search
CPC ..... H04L 1/1841; H04L 1/1642; H04L 47/34; H04L 12/2801; H04L 47/41
USPC ...................................................... 714/776
See application file for complete search history.

(56) References Cited

U.S. PATENT DOCUMENTS

| | | | |
|---|---|---|---|
| 9,065,747 B2* | 6/2015 | Bialkowski | H04L 47/12 |
| 10,820,057 B2* | 10/2020 | Eberle | H04L 45/7453 |
| 11,470,394 B2* | 10/2022 | Eberle | H04N 21/6583 |
| 2008/0071948 A1* | 3/2008 | James | G06F 13/385 |
| | | | 710/62 |
| 2014/0071968 A1* | 3/2014 | Raniere | H04W 28/065 |
| | | | 370/338 |
| 2015/0163174 A1* | 6/2015 | Koch | H04L 69/14 |
| | | | 370/242 |
| 2020/0145725 A1* | 5/2020 | Eberle | H04N 21/2387 |
| 2020/0374802 A1* | 11/2020 | Chu | H04W 48/18 |
| 2021/0084533 A1* | 3/2021 | Huang | H04L 45/245 |
| 2021/0152419 A1* | 5/2021 | Lu | H04L 41/0803 |
| 2021/0160353 A1* | 5/2021 | Qu | H04L 67/1097 |

* cited by examiner

*Primary Examiner* — Guy J Lamarre
*Assistant Examiner* — Osman M Alshack
(74) *Attorney, Agent, or Firm* — Buchalter; Jason W. Croft

(57) ABSTRACT

A system may include primary and secondary integrated circuits. The primary integrated circuit may receive a first subset of data packets associated with a first set of sequence numbers. The secondary integrated circuit may receive a second subset of data packets associated with a second set of sequence numbers. The primary integrated circuit is configured to manage the first set of sequence numbers and the second set of sequence numbers on behalf of the secondary integrated circuit and for the system.

14 Claims, 6 Drawing Sheets

DEVICE WITH MULTI-CHANNEL BONDING

CROSS-REFERENCE TO RELATED APPLICATIONS

This application claims priority to U.S. Provisional Application No. 63/176,146, filed Apr. 16, 2021, titled DEVICE WITH MULTI-CHANNEL BONDING, which is incorporated herein by reference in its entirety.

FIELD

Embodiments described herein relate to systems and devices with multi-channel bonding.

BACKGROUND

Unless otherwise indicated in the present disclosure, the materials described in the present disclosure are not prior art to the claims in the present application and are not admitted to be prior art by inclusion in this section.

An integrated circuit (IC) may include a set of electronic circuits on semiconductor material. ICs are often made from silicon. Some ICs may be made to conform to a particular standard, such as a Data Over Cable Service Interface Specification (DOCSIS) standard.

The subject matter claimed in the present disclosure is not limited to implementations that solve any disadvantages or that operate only in environments such as those described above. Rather, this background is only provided to illustrate one example technology area where some implementations described in the present disclosure may be practiced.

SUMMARY

A system may include primary and secondary integrated circuits. The primary integrated circuit may receive a first subset of data packets associated with a first set of sequence numbers. The secondary integrated circuit may receive a second subset of data packets associated with a second set of sequence numbers. The primary integrated circuit is configured to manage the first set of sequence numbers and the second set of sequence numbers on behalf of the secondary integrated circuit and for the system.

In an embodiment, a system includes a primary integrated circuit and a secondary integrated circuit. The primary integrated circuit includes a first primary communication interface, a second primary communication interface, and a third primary communication interface. The first primary communication interface is configured to receive a first subset of data packets over a first set of channels. Each packet of the data packets is associated with a respective sequence number. Each packet of the first subset of the data packets is associated with a first set of sequence numbers. The second primary communication interface is configured to receive a second set of sequence numbers. The third primary communication interface is configured to cause the first subset of the data packets to be stored in a buffer. The secondary integrated circuit includes a first secondary communication interface, a second secondary communication interface, and a third secondary communication interface. The first secondary communication interface is configured to receive a second subset of the data packets over a second set of channels. Each packet of the second subset of the data packets is associated with the second set of sequence numbers. The second secondary communication interface is configured to transmit the second set of sequence numbers to the primary integrated circuit via the second primary communication interface. The third secondary communication interface is configured to cause the second subset of the data packets to be stored in the buffer. The third primary communication interface is configured to cause the buffer to be released based on the respective sequence number of each packet. The buffer is associated with the first subset of the data packets and the second subset of the data packets.

In another embodiment, a device includes a first communication interface, a second communication interface, and a third communication interface. The first communication interface is configured to receive data packets over a set of channels. Each packet of the data packets is associated with a first set of sequence numbers. The second communication interface is configured to receive a second set of sequence numbers from a communicatively coupled device. The third communication interface is configured to cause the data packets to be stored in a buffer. The third communication interface is configured to cause the buffer to be released based on the first set of sequence numbers and the second set of sequence numbers.

In another embodiment, a device includes a first communication interface, a second communication interface, and a third communication interface. The first communication interface is configured to receive data packets over a set of channels. Each packet of the data packets is associated with a set of sequence numbers. The second communication interface is configured to transmit the set of sequence numbers to a communicatively coupled device. The third communication interface is configured to cause the data packets to be stored in a buffer.

The object and advantages of the embodiments will be realized and achieved at least by the elements, features, and combinations particularly pointed out in the claims. It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Figure 1:
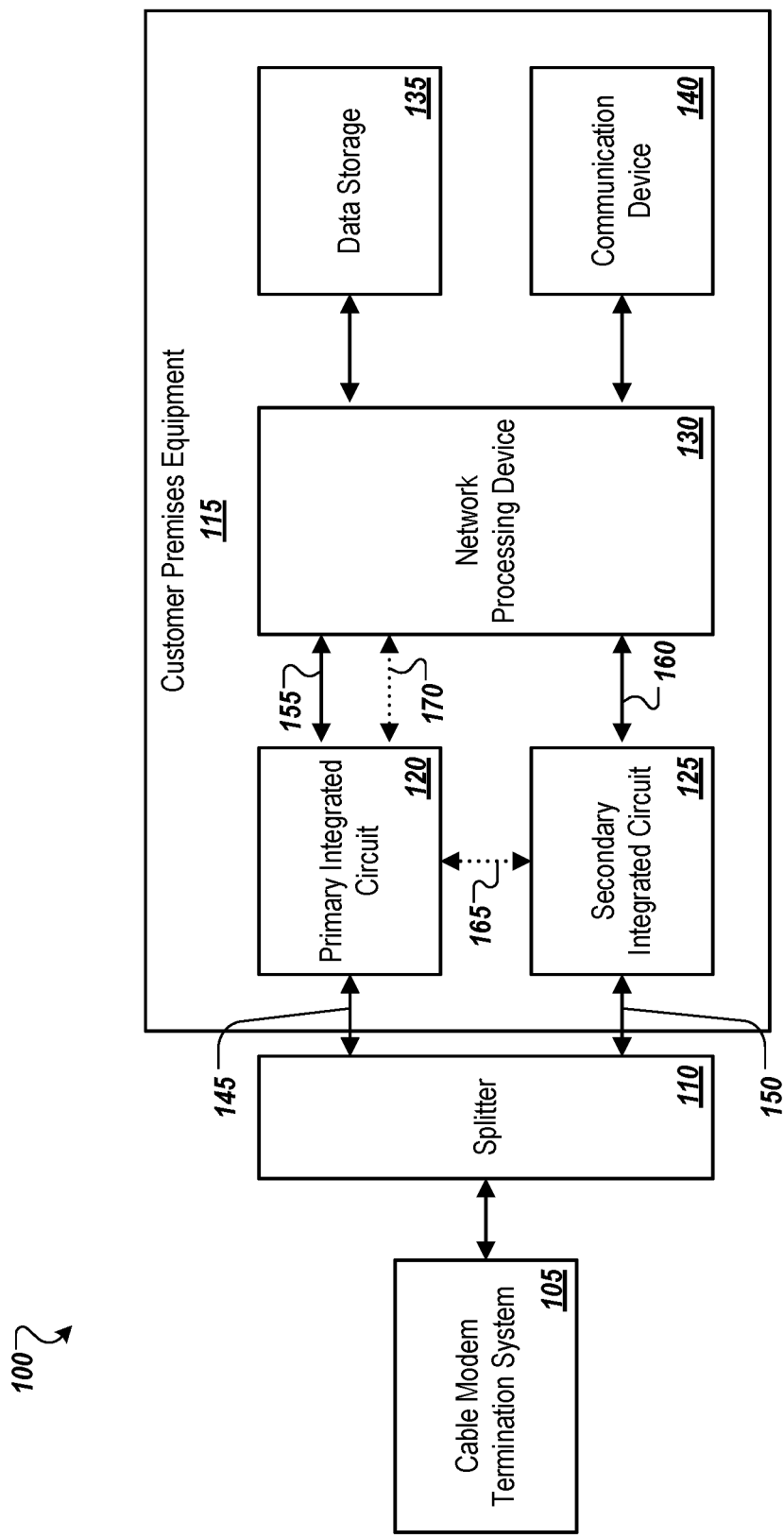
FIG. 1 illustrates a block diagram of an example system for multi-channel bonding.

A system on a chip (SoC) is one type of integrated circuit (IC). In some circumstances, SoCs may accelerate network deployment. For example, SoCs that are Data Over Cable Service Interface Specification (DOCSIS) compliant may enable high-performance connectivity. In some circumstances, SoCs may offer networking performance advantages such as radio frequency (RF) noise rejection and packet processing flexibility to provide optimal performance and improved quality of service in a variety of use cases including delivery of 15-50 or more gigabits per second (Gbps) service to customers' homes on existing infrastructure and other wide area network (WAN) and local area network (LAN) use cases.

In some circumstances, a cable modem termination system (CMTS) may enable communications to and from customer premises equipment (CPE), such as a cable modem and/or cable gateway. In some circumstances, the CMTS may communicate data with a head-end and the head-end may, in turn, communicate with the CPE. Data communication between the CMTS and the CPE may be sent on multiple channels spanning multiple frequencies. From a perspective of the CPE, incoming data may be referred to as downstream data and outgoing data may referred to upstream data. Some CPE may be limited to a particular number of upstream channels and/or downstream channels. Such limitations may be imposed by a particular standard, such as DOC SIS 3.0, DOCSIS 3.1, DOCSIS 4.0, etc. Alternatively, or additionally, the limitations on the CPE upstream channels and/or downstream channels may be hardware-based limitations. For example, a hardware limitation may support a fixed maximum of combined downstream and upstream channels, such as to fixed total maximum of 5 or 6 channels, e.g., four downstream channels and two upstream channels. As newer standards or revisions to those standards permit an increasing number of downstream channels and upstream channels, the physical limitations of the hardware may impose a limit to a number of downstream channels and upstream channels that may be less than a permissible number of downstream channels and upstream channels under a particular standard.

Moreover, some implementations may not be optimal for a large number of channels and may instead, be better suited to fewer than a maximum number of channels. Having many different configurations for downstream and upstream channels can make manufacturing difficult, as it may require many different types of tooling, frequent changeovers, etc.

Aspects of the present disclosure address these and other shortcomings of prior approaches by supporting multi-channel bonding in CPE, such as a cable device. The present disclosure also provides a flexible architecture which can enable support for multiple DOCSIS configurations (for one or both of downstream channels and upstream channels) based on a cost-effective silicon solution. For example, the present disclosure provides a flexible architecture that can be configured for different systems and requirements, such as for a DOCSIS4.0 system with five downstream channels and seven upstream channels (e.g., a 5×7 system) and/or DOCSIS4.0 system with eight downstream channels and two upstream channels (e.g., an 8×2 system). These two configurations are provided only as examples. Any number and/or combination of downstream channels and upstream channels are contemplated, such as a 2×1 system, a 2×2 system, a 4×2 system, a 10×14 system, a 15×21 system, a 20×50 system, a 30×28 system, a 100×500 system, and so forth. In some embodiments, to accomplish this flexible architecture configuration scheme, two or more ICs may be used where one IC of the two or more ICs is configured as a primary IC, and the remaining ICs are configured as secondary ICs. Moreover, techniques described herein can be used between different standards or specifications. For example, a DOCSIS4.0 system and a DOCSIS3.1 system may be combined for multi-channel bonding. In a specific example, one or more inputs to a system may be compliant with one standard, and a second input to the system may be compliant with another standard. Techniques described herein may permit multi-channel bonding using multiple inputs/channels with differing standards compliance.

FIG. 1 illustrates a block diagram of an example system 100 for multi-channel bonding, in accordance with at least one embodiment described in the present disclosure. In some embodiments, the system 100 may include a cable modem termination system (CMTS) 105, a splitter 110, and customer premises equipment (CPE) 115. In some embodiments, the CPE 115 may include a primary integrated circuit (IC) 120, a secondary IC 125, a network processing device 130, a data storage 135, a communication device 140, a first primary data path 145, a first secondary data path 150, a second primary data path 155, a second secondary data path 160, a control path 165, and a primary control path 170.

In some embodiments, the CMTS 105 may be configured to transmit data to one or more devices, such as the CPE 115. Alternatively, or additionally, the CMTS 105 may be configured to receive data from one or more devices, such as the CPE 115. In these and other embodiments, the CMTS 105 may be configured to transmit and receive data over one or more channels to improve and/or maximize bandwidth use. For example, the CMTS 105 may transmit data over any number of downstream channels (e.g., downstream channels may refer to channels for transmitting data packets from the CMTS 105 and upstream channels may refer to channels for receiving data packets by the CMTS 105), such as two, four, five, eight, ten, fifteen, or twenty downstream channels, and/or any other number of downstream channels. Similarly, the CMTS 105 may be configured to receive data over any number of upstream channels, such as two, four, seven, eight, ten, fifteen, or twenty-one upstream channels, and/or any other number of upstream channels. In these and other embodiments, the number of downstream channels and the number of upstream channels associated with the CMTS 105 may be the same or may differ in number.

In some embodiments, the CMTS 105 may be configured to determine the number of operable channels associated with a CPE 115. For example, in instances in which the primary IC 120 is configured to support four downstream channels and the secondary IC 125 is configured to support four downstream channels, the CMTS 105 may transmit data packets using eight downstream channels to match the bonded channels between the primary IC 120 and the secondary IC 125.

In some embodiments, the data transmitted by the CMTS 105 may be separated into data packets. The data packets may be related (e.g., multiple data packets relating to a single file, such as a document, archive, movie, etc.) or at least some of the data packets may be unrelated to other data packets (e.g., related to different files and/or data). In some embodiments, each data packet of the data packets may be arranged in view of a standard, such as the DOCSIS 4.0 specification. In some embodiments, each data packet may be assigned a respective sequence number by the CMTS 105. The respective sequence number may be used to maintain an order of the data packets in the event the data packets become disordered, such as during a transmission of the data packets by the CMTS 105. For example, the respective sequence number assigned to each data packet may be relative to the other data packets that may be included in a downstream transmission, such as a first data packet may be assigned a first value, a second data packet may be assigned a second value that follows the first value, and so forth.

In some embodiments, the CMTS 105 may transmit and/or receive data packets to and/or from the CPE 115. For simplicity of explanation, the present disclosure will consider the transmission of data packets from the CMTS 105 to the CPE 115 over downstream channels. Persons of skill in the art will recognize that the functions and principles discussed herein may be applicable to transmission of data packets from the CPE 115 to the CMTS 105 over upstream channels.

In some embodiments, the CPE 115 may include a single device that may be configured to receive data packets from the CMTS 105 over one or more downstream channels. For example, and as illustrated in FIG. 1, the CPE 115 may include the primary IC 120, the secondary IC 125, the network processing device 130, the data storage 135, and the communication device 140, all of which may be disposed in a device that may be the CPE 115. Alternatively, or additionally, one or more components of the CPE 115 may be separated into one or more devices that may be configured to operate in concert in receiving data packets from the CMTS 105. For example, the primary IC 120, the secondary IC 125, and the network processing device 130 may be a first device, the data storage 135 may be a second device, and the communication device 140 may be a third device, where each of the first device, the second device, and the third device may comprise the CPE 115. Alternatively, or additionally, other configurations, which may include more or less components that illustrated may also be included as the CPE 115, such that the CPE 115 may be configured to receive and/or process the data packets from the CMTS 105.

In some embodiments, the splitter 110 may be configured to receive the data packets transmitted from the CMTS 105 and may divide the data packets among communicatively coupled devices, such as the primary IC 120 and the secondary IC 125. In some embodiments, the splitter 110 may be communicatively coupled to more or less than the primary IC 120 and the secondary IC 125. For example, a tertiary IC (not illustrated in FIG. 1) may be included in the CPE 115 such that the splitter 110 may divide the data packets between the primary IC 120, the secondary IC 125, and the tertiary IC. Alternatively, in instances in which the number of downstream channels used by the CMTS 105 to transmit data packets may be handled by one IC, such as the primary IC 120, the splitter 110 may not divide the data packets between the primary IC 120 and the secondary IC 125 and/or the splitter 110 may be disabled and/or not included in the system 100.

In some embodiments, the primary IC 120 may include a system on a chip, a processor, an IC, etc. In some embodiments, the primary IC 120 may be configured to receive data packets from the CMTS 105, such as from the splitter 110. For example, the first primary data path 145 may be communicatively coupled to a first primary communication interface associated with the primary IC 120, and the data packets transmitted from the CMTS 105 may be conveyed by the first primary data path 145 to the primary IC 120. In some embodiments, the primary IC 120 may receive a portion of the data packets, or a subset of the data packets, sent from the CMTS 105, such as in instances in which the CMTS 105 transmits the data packets using more downstream channels than may be supported by the primary IC 120. For example, in instances in which the primary IC 120 supports four downstream channels and the CMTS 105 transmits data packets using eight downstream channels, the primary IC 120 may receive a first subset of the data packets and a second IC, such as the secondary IC 125, may receive a second subset of the data packets.

In some embodiments, the first primary data path 145 may be configured to support a number of channels (downstream and/or upstream) that may be equal to a number of channels the primary IC 120 may be configured to support. For example, in instances in which the primary IC 120 is configured to support data packets over four downstream channels, the first primary data path 145 may be configured to support data packets over at least four downstream channels.

In some embodiments, the primary IC 120 may be configured to obtain a respective sequence number associated with each data packet received by the primary IC 120, such as a first set of sequence numbers associated with the first subset of the data packets. For example, in instances in which the primary IC 120 receives the first, third, and fourth data packets from the CMTS 105, the primary IC 120 may obtain and/or store a first, third, and fourth sequence number, respectively, associated with the received first subset of the data packets.

In some embodiments, the first subset of the data packets transmitted by the CMTS 105 may be received by the primary IC 120 out of a sequential order in which the data packets should be received and/or processed. For example, the primary IC 120 may receive the fourth data packet first, the third data packet second, and the first data packet third. In these and other embodiments, the primary IC 120 may be configured to obtain the respective sequence number associated with each data packet of the data packets, such that data packets that may be out of order may be rearranged.

The CMTS 105 may send a second subset of the data packets to the secondary IC 125 via the splitter 110 and the first secondary data path 150. The second subset of the data packets may be associated with a second set of sequence numbers. The secondary IC 125 may send the second subset of data packets to the primary IC via the control path 165 so that the primary IC 145 can holistically manage all of the sequence numbers and release all data packets sent to the CPE 115 in an order related to the various sequence numbers.

In some embodiments, the primary IC 120 may receive the second set of sequence numbers over the control path 165. In some embodiments, the control path 165 may be communicatively couple the primary IC 120 with the secondary IC 125. For example, the primary IC 120 may include a second primary communication interface and the secondary IC 125 may include a second secondary communication interface, where the control path 165 may communicatively couple the primary IC 120 and the secondary IC 125 via the second primary communication interface and the second secondary communication interface. In these and other embodiments, the control path 165 may include a high-speed connection, such as peripheral component interconnect express (PCIe). For example, the control path 165 may include a PCIe generation 3 bus.

In these and other embodiments, the primary IC 120 may be configured to obtain the respective sequence number (e.g., the first set of sequence numbers and the second set of sequence numbers) associated with each data packet transmitted by the CMTS 105 (e.g., the first subset of the data packets and the second subset of the data packets). As such, the primary IC 120 may be configured to reorder the data packets based on the sequential order of the data packets as assigned by the CMTS 105. For example, the first, third, and fourth data packets may be obtained by the primary IC 120 (e.g., in any order) and the second, fifth, and sixth data packets may be obtained by the secondary IC 125 (e.g., in any order) and the primary IC 120 may be configured to determine the sequential order of the data packets to be the first data packet, the second data packet, and so forth, and to release the data packets according to the sequential order.

In some embodiments, the primary IC 120 may cause received data packets from the CMTS 105 to be stored in a buffer. In some embodiments, the buffer may be associated with the primary IC 120, the network processing device 130, and/or the data storage 135. In instances in which the buffer is remote from the primary IC 120, the data packets received by the primary IC 120 may be transmitted by the primary IC 120 using the second primary data path 155. The second primary data path 155 may be associated with a third primary communication interface of the primary IC 120. The second primary data path 155 may be similar to the first primary data path 145, such that the second primary data path 155 may be configured to support a number of channels that may be equal to a number of channels the primary IC 120 may be configured to support. Additional details associated with the buffer and the storage of data packets therein may be further discussed herein relative to FIG. 2.

In some embodiments, the primary IC 120 may be configured to cause the buffer to be released to the network processing device 130 based on the sequential order, as determined by the primary IC 120. For example, the primary IC 120 may determine the sequential order of the data packets based on the first set of sequence numbers and the second set of sequence numbers, and the primary IC 120 may cause the buffer to release the data packets according to the sequential order. In some embodiments, the primary IC 120 may direct a transmission, such as a control transmission over the primary control path 170 to the buffer and/or a processing device associated with the buffer, such as the network processing device 130, to release the buffer based on the sequential order. A control transmission may include a transmission associated with the respective sequence numbers and/or the sequential order of the data packets. A control transmission may occur between the primary IC 120 and the secondary IC 125, between the primary IC 120 and the network processing device 130, and/or between the primary IC 120 and a buffer (e.g., the data storage 135) associated with the data packets.

In some embodiments, the primary control path 170 may be combined with the second primary data path 155 such that transmissions related to either the primary control path 170 or the second primary data path 155 may be performed by a single communication interface. For example, the third primary communication interface associated with the primary IC 120 may be configured to support data packet transmissions over the second primary data path 155 and/or control path transmissions over the primary control path 170. In these and other embodiments, the third primary communication interface may be coupled to the network processing device 130 via a high-speed connection, such as PCIe. For example, the primary data path 155 and/or the primary control path 170 may include a PCIe generation 3 bus.

In some embodiments, the secondary IC 125 may include a system on a chip, a processor, an IC, etc. In some embodiments, the secondary IC 125 may include one or more similar functions as the primary IC 120. For example, the secondary IC 125 may be configured to receive data packets, such as a second subset of data packets, from the CMTS 105, such as from the splitter 110. For example, the first secondary data path 150 may be communicatively coupled to a first secondary communication interface associated with the secondary IC 125, and the data packets transmitted from the CMTS 105 may be conveyed by the first secondary data path 150 to the secondary IC 125.

In some embodiments, the number of channels supported by the secondary IC 125 may be the same as the primary IC 120. For example, the primary IC 120 and the secondary IC 125 may each support four downstream channels and two upstream channels (the number of supported channels is illustrative only and not limiting, as described herein). Alternatively, or additionally, the number of channels supports by the secondary IC 125 may differ from the number of channels supported by the primary IC 120. For example, the primary IC 120 may support four downstream channels and two upstream channels while the secondary IC 125 may support three downstream channels and three upstream channels. In these and other embodiments, the number of channels supported by either the primary IC 120 and/or the secondary IC 125 may be related to the silicon on which the IC is disposed.

In some embodiments, the first secondary data path 150 may be configured to support a number of channels that may be equal to a number of channels the secondary IC 125 may be configured to support. For example, in instances in which the secondary IC 125 is configured to support data packets over four downstream channels, the first secondary data path 150 may be configured to support data packets over at least four downstream channels.

In some embodiments, the secondary IC 125 may be configured to obtain a respective sequence number associated with each data packet received by the secondary IC 125, such as a second set of sequence numbers associated with the second subset of the data packets. For example, in instances in which the secondary IC 125 receives the second, fifth, and sixth data packets from the CMTS 105, the secondary IC 125 may obtain a second, fifth, and sixth sequence number, respectively, associated with the received second subset of the data packets.

In some embodiments, the secondary IC 125 may be configured to transmit the second set of sequence numbers to the primary IC 120, such as via the control path 165, as described herein. In some embodiments, the secondary IC 125 may have a reordering functionality disabled such that the secondary IC 125 may not determine the sequential order associated with the second set of sequence numbers. In such instances, the secondary IC 125 may be configured to transmit the second set of sequence numbers to the primary IC 120, where the sequential order of the data packets may be determined. In at least some embodiments, the data packet sequence management may be transparent to the secondary IC 125, such that the secondary IC 125 may not know that the primary IC 120 is handling the data packet sequence management.

In some embodiments, a resequencing component associated with the secondary IC 125 may be redirected to the primary IC 120. For example, a base address associated with the resequencing component of the secondary IC 125 may be redirected to be associated with the primary IC 120 such that the secondary IC 125 may issue resequencing commands which may be received by the primary IC 120 and not the buffer (e.g., the secondary IC 125 may attempt to release the buffer based on the second set of sequence numbers, but instead may transmit the second set of sequence numbers to the primary IC 120).

In some embodiments, the secondary IC 125 may cause received data packets from the CMTS 105 to be stored in a buffer. In some embodiments, the buffer may be associated with the secondary IC 125, the network processing device 130, and/or the data storage 135. In instances in which the buffer is remote from the secondary IC 125, the data packets received by the secondary IC 125 may be transmitted by the secondary IC 125 using the second secondary data path 160. The second secondary data path 160 may be associated with a third secondary communication interface of the secondary IC 125. The second secondary data path 160 may be similar to the first secondary data path 150, such that the second secondary data path 160 may be configured to support a number of channels that may be equal to a number of channels the secondary IC 125 may be configured to support. Additional details associated with the buffer and the storage of data packets therein may be further discussed herein relative to FIG. 2. In these and other embodiments, the third secondary communication interface may be coupled to the network processing device 130 via a high-speed connection, such as PCIe. For example, the second secondary data path 160 may include a PCIe generation 3 bus.

In some embodiments, the network processing device 130 may include a system on a chip, a processor, an IC, etc. In some embodiments, the network processing device 130 may be configured to work with one or more standards associated with data transfer, such as DOCSIS 3.1, DOCSIS 4.0, etc. For example, the network processing device 130 may be configured to be compatible with both DOCSIS 3.1 and DOCSIS 4.0.

In some embodiments, the network processing device 130 may be configured to receive and/or process data packets that may be transmitted over multiple channels. For example, the primary IC 120 may be configured to receive data packets over a first five channels and the secondary IC 125 may be configured to receive data packets over a second five channels, and the network processing device 130 may be configured to process the data packets associated with both the primary IC 120 and the secondary IC 125. In these and other embodiments, the network processing device may be configured to process multiple bonded channels.

In some embodiments, the data storage 135 may include any data storage structure or device that may be configured to store data packets. For example, the data storage 135 may include any variation of double data rate (DDR) memory, such as DDR5-7200, DDR5-5000, DDR4-3200, and so forth. Alternatively, or additionally, the data storage 135 may be configured to release data packets from storage upon receiving a request to release one or more data packets. Additional details of potential arrangements of the data storage 135 may be further discussed herein relative to FIG. 2.

In some embodiments, the communication device 140 may be configured to transmit the data obtained from the processed data packets to a user device. For example, a user device may connect with the CPE 115 and/or the communication device 140 and may receive the data obtained from the processed data packets. In some embodiments, the communication device 140 may include a wired device and/or wired interface, such as a local area network. Alternatively, or additionally, the communication device 140 may include a wireless device and/or wireless interface, such as a wireless local area network.

Modifications, additions, or omissions may be made to the system 100 without departing from the scope of the present disclosure. For example, in some embodiments, the CPE 115 may include one or more additional integrated circuits that may be configured receive a subset of data packets from the CMTS 105. For example, a tertiary IC may be similar in operation to the secondary IC 125, such that the tertiary IC may receive a third subset of the data packets, cause the third subset of the data packets to be stored in a buffer, and transmit a third set of sequence numbers to the primary IC 120 for reordering to obtain the sequential number associated with the data packets.

Alternatively, or additionally, in some embodiments, the system 100 may include any number of other blocks that may not be explicitly illustrated or described.

Figure 2:
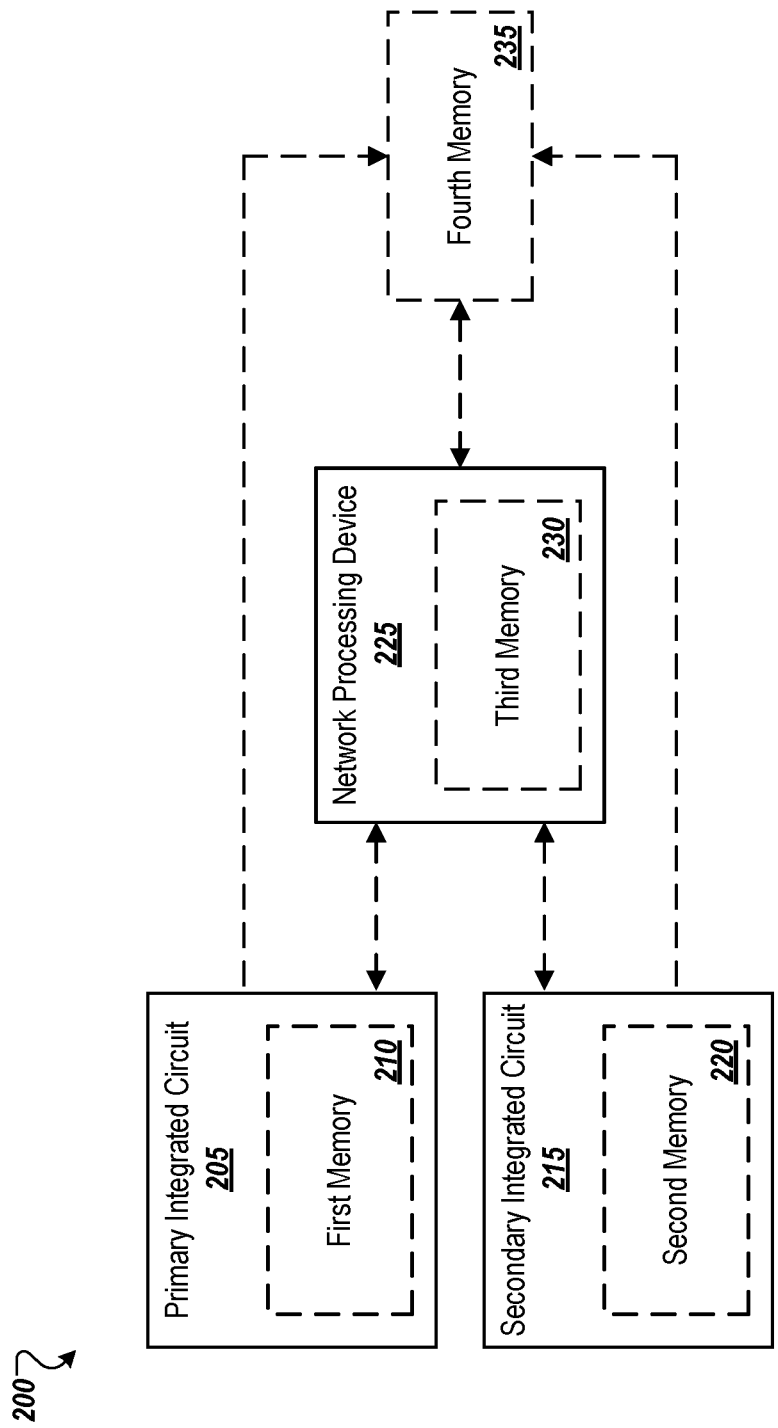
FIG. 2 illustrates a block diagram of another example system for multi-channel bonding.

FIG. 2 illustrates a block diagram of another example system 200 for multi-channel bonding, in accordance with at least one embodiment described in the present disclosure. The system 200 may include a primary IC 205, a secondary IC 215, a network processing device 225, and a fourth memory 235. The primary IC 205 may include a first memory 210, the secondary IC 215 may include a second memory 220, and the network processing device 225 may include a third memory 230.

In some embodiments, the primary IC 205, the secondary IC 215, and the network processing device 225 may be the same or similar as the primary IC 120, the secondary IC 125, and the network processing device 130 of FIG. 1, respectively, and/or may be configured to perform the same or similar functions as the primary IC 120, the secondary IC 125, and the network processing device 130 of FIG. 1, respectively.

In some embodiments, in response to receiving a first set of data packets, the primary IC 205 may be configured to store the first set of data packets in the first memory 210. Alternatively, or additionally, the primary IC 205 may be configured to store the first set of data packets in the third memory 230, such as by transmitting the first set of data packets to the network processing device 225 and directing the network processing device 225 to store the first set of data packets in the third memory 230. Alternatively, or additionally, the primary IC 205 may be configured to store the first set of data packets in the fourth memory 235, which fourth memory 235 may be remote from either or both the primary IC 205 and/or the network processing device 225.

Similar to the operations of the primary IC 205, in some embodiments, in response to receiving a second set of data packets, the secondary IC 215 may be configured to store the second set of data packets in the second memory 220. Alternatively, or additionally, the secondary IC 215 may be configured to store the second set of data packets in the third memory 230, such as by transmitting the second set of data packets to the network processing device 225 and directing the network processing device 225 to store the second set of data packets in the third memory 230. Alternatively, or additionally, the secondary IC 215 may be configured to store the second set of data packets in the fourth memory 235, which fourth memory 235 may be remote from either or both the secondary IC 215 and/or the network processing device 225.

In these and other embodiments, the data packets (e.g., the first set of data packets and the second set of data packets) may be stored in one memory location as described herein. Alternatively, or additionally, the data packets may be stored in a distributed approach. For example, the first set of data packets may be partially stored in the first memory 210, the third memory 230, and the fourth memory 235, and/or any combination of the first memory 210, the third memory 230, and the fourth memory 235.

Modifications, additions, or omissions may be made to the system 200 without departing from the scope of the present disclosure. For example, in some embodiments, the system 200 may include any number of other blocks that may not be explicitly illustrated or described.

Figure 3:
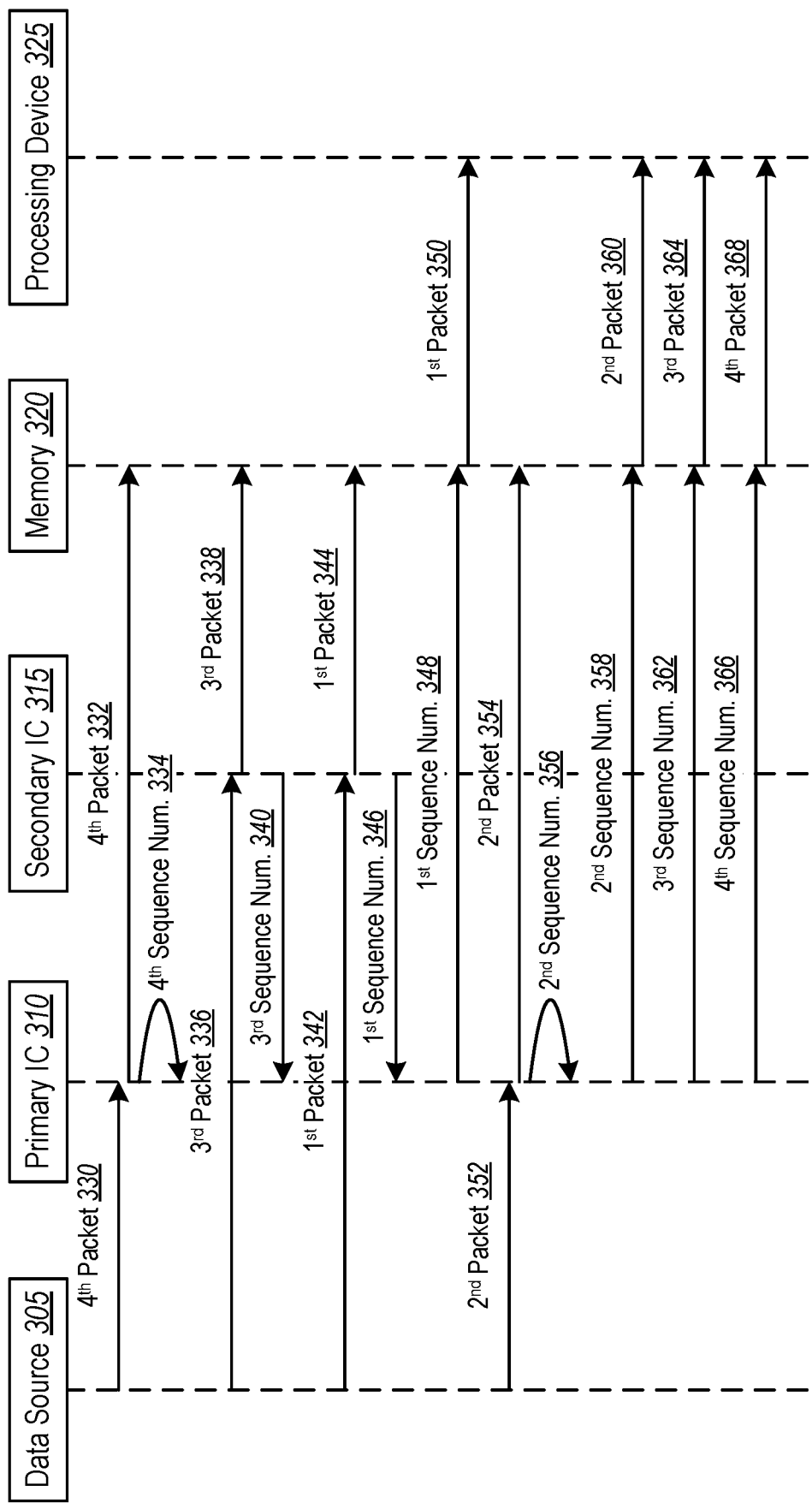
FIG. 3 illustrates example operations associated with multi-channel bonding.

FIG. 3 illustrates example operations 300 associated with multi-channel bonding, in accordance with at least one embodiment described in the present disclosure. In the illustrated example, the operations 300 may be between a data source 305, a primary IC 310, a secondary IC 315, a memory 320, and a processing device 325. In some embodiments, the data source 305, the primary IC 310, the secondary IC 315, the memory 320, and the processing device 325 may be the same or similar as the CMTS 105, the primary IC 120, the secondary IC 125, the data storage 135, and the network processing device 130, respectively, of FIG. 1. Alternatively, or additionally, the operations 300 may be an example of the operation of the elements of the system 100 of FIG. 1.

The operations 300 may relate to processing data packets according to an order associated with the data packets, which order may differ from an order in which the data packets may be received. In these and other embodiments, the operations 300 may include a data source transmitting data packets to one or more ICs, which may store and maintain an order associated with the data packets for additional processing by another device. The operations 300 illustrated are not exhaustive but are merely representative of operations 300 that may occur. Furthermore, one operation as illustrated may represent one or more communications, operations, and/or data exchanges.

At operation 330, the data source 305 may transmit a data packet, such as the fourth data packet, to the primary IC 310. The fourth data packet may be associated with one or more other packets, where each of the data packets may include a sequential order, the sequential order relative to one or more other data packets. For example, the fourth data packet may be ordered after the third data packet, which may be ordered after the second data packet, and so forth.

At operation 332, the primary IC 310 may cause the fourth data packet to be stored in the memory 320. In some embodiments, the memory 320 may include one location or the memory 320 may include a distributed approach such that the memory 320 may include more than one location. Additional details associated with the memory 320 and the storage of data packets therein may be further discussed relative to the description associated with FIG. 2.

At operation 334, the primary IC 310 may store the fourth sequence number. The fourth sequence number may be associated with the fourth data packet, which may indicate the sequential order of the fourth data packet. In some embodiments, the fourth sequence number may be included as a portion of the fourth data packet. For example, a specification associated with a standard for transmitting the data packets (e.g., a DOCSIS 4.0) may direct a portion of a data packet to include a sequential order associated with the data packet. In some embodiments, the data source 305 may include the sequential order (e.g., the fourth sequence number) in the fourth data packet.

At operation 336, the data source 305 may transmit the third data packet to the secondary IC 315.

At operation 338, the secondary IC 315 may cause the third data packet to be stored in the memory 320. In some embodiments, the secondary IC 315 may cause data packets to be stored in a memory location that may be the same as the primary IC 310. Alternatively, or additionally, the secondary IC 315 may cause data packets to be stored in a memory location that differs from the primary IC 310.

At operation 340, the secondary IC 315 may transmit the third sequence number to the primary IC 310. In some embodiments, the primary IC 310 may be configured to maintain an order of the sequence numbers associated with data packets that have been received from the data source 305. For example, operation 334 and operation 340 include the fourth sequence number and the third sequence number, respectively, that may be received out of the sequential order. In such instances, the primary IC 310 may be configured to order the sequence numbers relative to the sequential order associated with the data packets, and not the order in which the data packets may be received.

At operation 342, the data source 305 may transmit the first data packet to the secondary IC 315.

At operation 344, the secondary IC 315 may cause the first data packet to be stored in the memory 320.

At operation 346, the secondary IC 315 may transmit the first sequence number to the primary IC 310.

At operation 348, the primary IC 310 may determine the first sequence number associated with the first data packet is the first in the sequential order. Alternatively, or additionally, the primary IC 310 may determine that the first data packet is the data packet to first be released. In response to determining the first data packet is the first to be released, the primary IC 310 may cause the memory 320 to release the first data packet to the processing device 325.

At operation 350, the memory 320 may release the first data packet to the processing device 325. In some embodiments, the memory 320 releasing a data packet may include transmitting the data packet to the processing device 325. Alternatively, or additionally, in instances in which the memory 320 is associated with the processing device 325, the memory 320 releasing a data packet may include the processing device 325 retrieving the data packet from the memory 320.

At operation 352, the data source 305 may transmit the second data packet to the primary IC 310.

At operation 354, the primary IC 310 may cause the second data packet to be stored in the memory 320.

At operation 356, the primary IC 310 may store the fourth sequence number.

At operation 358, the primary IC 310 may determine the second sequence number associated with the second data packet is next in the sequential order (e.g., following the first data packet). In response to determining the second data packet is the next to be released, the primary IC 310 may cause the memory 320 to release the second data packet to the processing device 325.

At operation 360, the memory 320 may release the second data packet to the processing device 325.

At operation 362, the primary IC 310 may determine the third sequence number associated with the third data packet is next in the sequential order (e.g., following the second data packet). In response to determining the third data packet is the next to be released, the primary IC 310 may cause the memory 320 to release the third data packet to the processing device 325.

At operation 364, the memory 320 may release the third data packet to the processing device 325.

At operation 366, the primary IC 310 may determine the fourth sequence number associated with the fourth data packet is next in the sequential order (e.g., following the third data packet). In response to determining the fourth data packet is the next to be released, the primary IC 310 may cause the memory 320 to release the fourth data packet to the processing device 325.

At operation 368, the memory 320 may release the fourth data packet to the processing device 325.

Modifications, additions, or omissions may be made to the operations 300 without departing from the scope of the present disclosure. For example, in some embodiments, one or more of the operations 300 may occur in a different sequence than illustrated. For example, the first packet associated with operation 342 may be received before the third packet associated with operation 336. Alternatively, or additionally, in some embodiments, one or more of the operations 300 may be configured to occur concurrently. For example, the primary IC 310 may receive the second packet associated with operation 352 at substantially the same time as the primary IC 310 determines the first data packet is the first to be released associated with operation 348.

Figure 4:
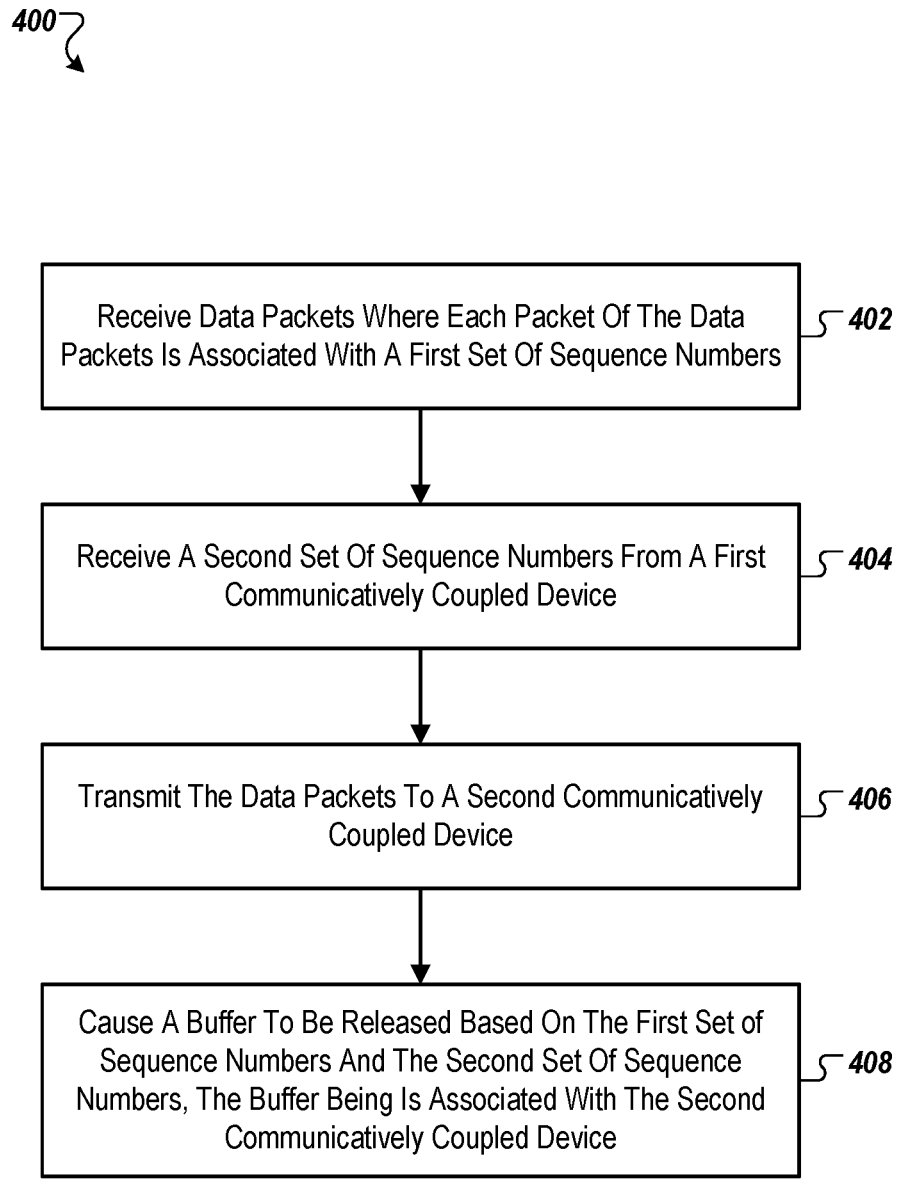
FIG. 4 illustrates a flowchart of an example method for multi-channel bonding.

FIG. 4 illustrates a flowchart of an example method 400 for multi-channel bonding, in accordance with at least one embodiment described in the present disclosure.

Figure 6:
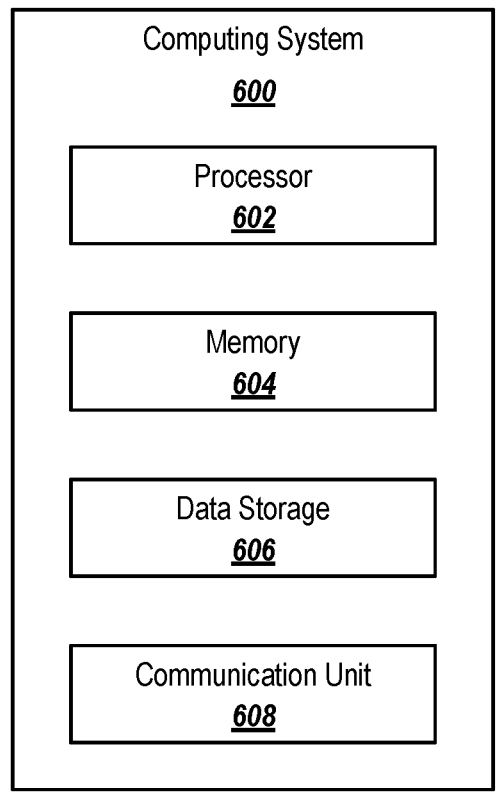
FIG. 6 illustrates an example computing system that may be used for multi-channel bonding.

The method 400 may be performed by processing logic that may include hardware (circuitry, dedicated logic, etc.), software (such as is run on a computer system or a dedicated machine), or a combination of both, which processing logic may be included in the primary IC 120 of FIG. 1, the computing system 600 of FIG. 6, or another device, combination of devices, or systems.

For simplicity of explanation, methods described herein are depicted and described as a series of acts. However, acts in accordance with this disclosure may occur in various orders and/or concurrently, and with other acts not presented and described herein. Further, not all illustrated acts may be used to implement the methods in accordance with the disclosed subject matter. In addition, those skilled in the art will understand and appreciate that the methods may alternatively be represented as a series of interrelated states via a state diagram or events. Additionally, the methods disclosed in this specification are capable of being stored on an article of manufacture, such as a non-transitory computer-readable medium, to facilitate transporting and transferring such methods to computing devices. The term article of manufacture, as used herein, is intended to encompass a computer program accessible from any computer-readable device or storage media. Although illustrated as discrete blocks, various blocks may be divided into additional blocks, combined into fewer blocks, or eliminated, depending on the desired implementation.

The method 400 may begin at block 402, where the processing logic may receive data packets over a set of channels. In some embodiments, each packet of the data packets may be associated with a first set of sequence numbers. In some embodiments, the first set of sequence numbers may include a first sequential order. In some embodiments, the first sequential order may be assigned by a data source associated with the data packets.

At block 404, the processing logic may receive a second set of sequence numbers from a first communicatively coupled device. In some embodiments, the second set of sequence numbers may be associated with second data packets that may be received over a second set of channels. In some embodiments, the second set of sequence numbers may include a second sequential order. In some embodiments, the second sequential order may be assigned by the data source associated with the data packets.

At block 406, the processing logic may transmit the data packets to a second communicatively coupled device.

At block 408, the processing logic may cause a buffer to be released based on the first set of sequence numbers and the second set of sequence numbers. In some embodiments, the buffer may be associated with the second communicatively coupled device. In some embodiments, the buffer may be released based on a sequential order, where the sequential order may include a combination of the first sequential order and the second sequential order.

Modifications, additions, or omissions may be made to the method 400 without departing from the scope of the present disclosure. For example, in some embodiments, the method 400 may include any number of other blocks that may not be explicitly illustrated or described.

Figure 5:
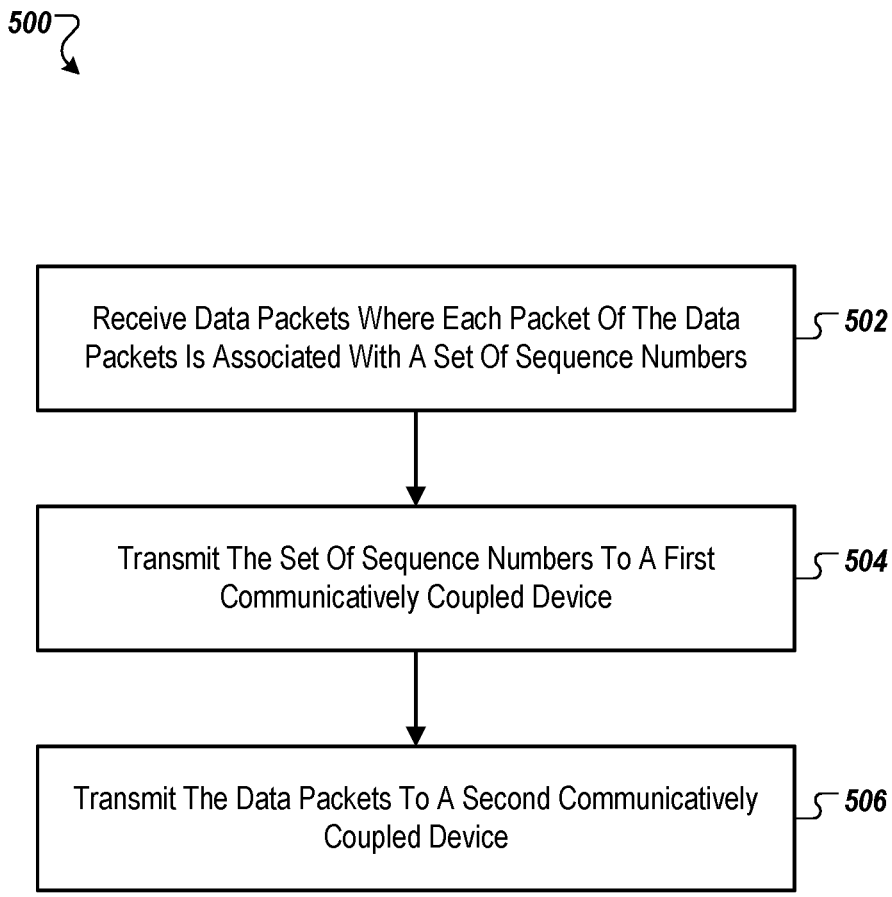
FIG. 5 illustrates a flowchart of another example method for multi-channel bonding.

FIG. 5 illustrates a flowchart of an example method 500 for multi-channel bonding, in accordance with at least one embodiment described in the present disclosure.

The method 500 may be performed by processing logic that may include hardware (circuitry, dedicated logic, etc.), software (such as is run on a computer system or a dedicated machine), or a combination of both, which processing logic may be included in the secondary IC 125 of FIG. 1, the computing system 600 of FIG. 6, or another device, combination of devices, or systems.

For simplicity of explanation, methods described herein are depicted and described as a series of acts. However, acts in accordance with this disclosure may occur in various orders and/or concurrently, and with other acts not presented and described herein. Further, not all illustrated acts may be used to implement the methods in accordance with the disclosed subject matter. In addition, those skilled in the art will understand and appreciate that the methods may alternatively be represented as a series of interrelated states via a state diagram or events. Additionally, the methods disclosed in this specification are capable of being stored on an article of manufacture, such as a non-transitory computer-readable medium, to facilitate transporting and transferring such methods to computing devices. The term article of manufacture, as used herein, is intended to encompass a computer program accessible from any computer-readable device or storage media. Although illustrated as discrete blocks, various blocks may be divided into additional blocks, combined into fewer blocks, or eliminated, depending on the desired implementation.

The method 500 may begin at block 502, where the processing logic may receive data packets over a set of channels. In some embodiments, each packet of the data packets may be associated with a set of sequence numbers. In some embodiments, the set of sequence numbers may include a sequential order. In some embodiments, the sequential order may be assigned by a data source associated with the data packets.

At block 504, the processing logic may transmit the set of sequence numbers to a first communicatively coupled device.

At block 506, the processing logic may transmit the data packets to a second communicatively coupled device.

Modifications, additions, or omissions may be made to the method 500 without departing from the scope of the present disclosure. For example, in some embodiments, the method 500 may include any number of other blocks that may not be explicitly illustrated or described.

FIG. 6 illustrates an example computing system 600 that may be used for multi-channel bonding, in accordance with at least one embodiment described in the present disclosure. The computing system 600 may be configured to implement or direct one or more operations associated with multi-channel bonding, which may include the primary IC 120, the secondary IC 125, and/or the network processing device 130 of FIG. 1. The computing system 600 may include a processor 602, memory 604, data storage 606, and a communication unit 608, which all may be communicatively coupled. In some embodiments, the computing system 600 may be part of any of the systems or devices described in this disclosure.

For example, the computing system 600 may be part of the primary IC 120, the secondary IC 125, and/or the network processing device 130 of FIG. 1 and may be configured to perform one or more of the tasks described above with respect to the primary IC 120, the secondary IC 125, and/or the network processing device 130, respectively.

The processor 602 may include any computing entity, or processing device including various computer hardware or software modules and may be configured to execute instructions stored on any applicable computer-readable storage media. For example, the processor 602 may include a microprocessor, a microcontroller, a parallel processor such as a graphics processing unit (GPU) or tensor processing unit (TPU), a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 6, it is understood that the processor 602 may include any number of processors distributed across any number of networks or physical locations that are configured to perform individually or collectively any number of operations described herein.

In some embodiments, the processor 602 may be configured to interpret and/or execute program instructions and/or process data stored in the memory 604, the data storage 606, or the memory 604 and the data storage 606. In some embodiments, the processor 602 may fetch program instructions from the data storage 606 and load the program instructions in the memory 604. After the program instructions are loaded into memory 604, the processor 602 may execute the program instructions.

For example, in some embodiments, the processor 602 may be configured to interpret and/or execute program instructions and/or process data stored in the memory 604, the data storage 606, or the memory 604 and the data storage 606. The program instruction and/or data may be related to multi-channel bonding such that the computing system 600 may perform or direct the performance of the operations associated therewith as directed by the instructions. In these and other embodiments, the instructions may be used to perform the operations 300 of FIG. 3, the method 400 of FIG. 4, and/or the method 500 of FIG. 5.

The memory 604 and the data storage 606 may include computer-readable storage media or one or more computer-readable storage mediums for carrying or having computer-executable instructions or data structures stored thereon. Such computer-readable storage media may be any available media that may be accessed by a computer, such as the processor 602.

By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a computer. Combinations of the above may also be included within the scope of computer-readable storage media.

Computer-executable instructions may include, for example, instructions and data configured to cause the processor 602 to perform a certain operation or group of operations as described in this disclosure. In these and other embodiments, the term "non-transitory" as explained in the present disclosure should be construed to exclude only those types of transitory media that were found to fall outside the scope of patentable subject matter in the Federal Circuit decision of In re Nuijten, 500 F.3d 1346 (Fed. Cir. 2007). Combinations of the above may also be included within the scope of computer-readable media.

The communication unit 608 may include any component, device, system, or combination thereof that is configured to transmit or receive information over a network. In some embodiments, the communication unit 608 may communicate with other devices at other locations, the same location, or even other components within the same system. For example, the communication unit 608 may include a modem, a network card (wireless or wired), an infrared communication device, a wireless communication device (such as an antenna implementing 4G (LTE), 4.5G (LTE-A), and/or 5G (mmWave) telecommunications), and/or chipset (such as a Bluetooth® device (e.g., Bluetooth 5 (Bluetooth Low Energy)), an 802.6 device (e.g., Metropolitan Area Network (MAN)), a Wi-Fi device (e.g., IEEE 802.11ax, a WiMax device, cellular communication facilities, etc.), and/or the like. The communication unit 608 may permit data to be exchanged with a network and/or any other devices or systems described in the present disclosure. For example, when the computing system 600 is included in the primary IC 120 of FIG. 1, the communication unit 608 may allow the primary IC 120 to communicate with the secondary IC 125 and/or the network processing device 130 of FIG. 1.

Modifications, additions, or omissions may be made to the computing system 600 without departing from the scope of the present disclosure. For example, in some embodiments, the computing system 600 may include any number of other components that may not be explicitly illustrated or described. Further, depending on certain implementations, the computing system 600 may not include one or more of the components illustrated and described.

As indicated above, the embodiments described herein may include the use of a computing system (e.g., the processor 602 of FIG. 6) including various computer hardware or software modules. Further, as indicated above, embodiments described herein may be implemented using computer-readable media (e.g., the memory 604 of FIG. 6) for carrying or having computer-executable instructions or data structures stored thereon.

In some embodiments, the different components, modules, engines, and services described herein may be implemented as objects or processes that execute on a computing system (e.g., as separate threads). While some of the systems and methods described herein are generally described as being implemented in software (stored on and/or executed by hardware), specific hardware implementations or a combination of software and specific hardware implementations are also possible and contemplated.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A system comprising:
a primary integrated circuit comprising:
a first primary communication interface configured to receive a first subset of data packets over a first set of channels where each packet of the data packets is associated with a respective sequence number, and each packet of the first subset of the data packets is associated with a first set of sequence numbers;
a second primary communication interface configured to receive a second set of sequence numbers; and
a third primary communication interface configured to cause the first subset of the data packets to be stored in a buffer; and
a secondary integrated circuit comprising:
a first secondary communication interface configured to receive a second subset of the data packets over a second set of channels where each packet of the second subset of the data packets is associated with the second set of sequence numbers;
a second secondary communication interface configured to transmit the second set of sequence numbers to the primary integrated circuit via the second primary communication interface; and
a third secondary communication interface configured to cause the second subset of the data packets to be stored in the buffer,
wherein the third primary communication interface is configured to cause the buffer to be released based on the respective sequence number of each packet, the buffer being associated with the first subset of the data packets and the second subset of the data packets.

2. The system of claim 1, further comprising a data source communicatively coupled to the primary integrated circuit via the first primary communication interface and to the secondary integrated circuit via the first secondary communication interface.

3. The system of claim 2, wherein the data source is a cable modem termination system.

4. The system of claim 2, wherein the respective sequence number associated with each packet of the data packets includes a sequential order assigned by the data source.

5. The system of claim 4, wherein the primary integrated circuit is configured to cause the buffer to be released based on the sequential order.

6. The system of claim 1, wherein the first set of sequence numbers are sequentially ordered, and the second set of sequence numbers are sequentially ordered.

7. The system of claim 6, wherein at least one sequence number from the second set of sequence numbers comes before at least one sequence number from the first set of sequence numbers.

8. The system of claim 1, further comprising a network processing device communicatively coupled to the primary integrated circuit via the third primary communication interface and to the secondary integrated circuit via the third secondary communication interface, wherein in response to the primary integrated circuit causing the buffer to release a first data packet, the network processing device receives the first data packet.

9. The system of claim 8, further comprising a memory communicatively coupled to the network processing device and configured to receive the first subset of the data packets from the primary integrated circuit and the second subset of the data packets from the secondary integrated circuit.

10. The system of claim 8, further comprising a communication device communicatively coupled to the network processing device and configured to transmit the first data packet in response to receiving the first data packet from the network processing device.

11. The system of claim 10, the primary integrated circuit, the secondary integrated circuit, and the network processing device are disposed in a first device and the communication device is disposed in a second device.

12. The system of claim 1, wherein the first set of channels comprises one or more first upstream channels and one or more first downstream channels, and the second set of channels comprises one or more second upstream channels and one or more second downstream channels.

13. The system of claim 12, wherein the first subset of data packets are transmitted over the first downstream channels and the second subset of data packets are transmitted over the second downstream channels.

14. The system of claim 1, further comprising a tertiary integrated circuit comprising:
- a first tertiary communication interface configured to receive a third subset of the data packets over a third set of channels where each packet of the data packets is associated with a third set of sequence numbers;
- a second tertiary communication interface configured to transmit the third set of sequence numbers to the primary integrated circuit via the second primary communication interface; and
- a third tertiary communication interface configured to transmit the third subset of the data packets.

\* \* \* \* \*